United States Patent
Hayashida (10) Patent No.: US 11,363,157 B2
(45) Date of Patent: Jun. 14, 2022

(54) INFORMATION PROCESSING APPARATUS, IMAGE FORMING APPARATUS, AND NON-TRANSITORY COMPUTER READABLE MEDIUM STORING PROGRAM

(71) Applicant: FUJIFILM Business Innovation Corp., Tokyo (JP)

(72) Inventor: Toshiharu Hayashida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 192 days.

(21) Appl. No.: 16/438,497

(22) Filed: Jun. 12, 2019

(65) Prior Publication Data

US 2019/0394348 A1    Dec. 26, 2019

(30) Foreign Application Priority Data

Jun. 22, 2018    (JP) .............................. JP2018-119117

(51) Int. Cl.
  *G06K 15/22*    (2006.01)
  *H04N 1/00*    (2006.01)

(52) U.S. Cl.
  CPC ..... *H04N 1/00925* (2013.01); *H04N 1/00352* (2013.01); *H04N 1/00405* (2013.01)

(58) Field of Classification Search
  CPC ........... H04N 1/00925; H04N 1/00352; H04N 1/00405
  See application file for complete search history.

(56) References Cited

U.S. PATENT DOCUMENTS

| | | | |
|---|---|---|---|
| 2004/0145766 A1* | 7/2004 | Sugishita | G06F 3/1204 358/1.13 |
| 2009/0006833 A1* | 1/2009 | Yamada | G06F 3/1211 713/2 |
| 2012/0327458 A1* | 12/2012 | Baba | H04N 1/00896 358/1.15 |
| 2017/0003977 A1* | 1/2017 | Sumida | G06F 9/45558 |
| 2017/0264768 A1 | 9/2017 | Sayama | |

FOREIGN PATENT DOCUMENTS

| | | |
|---|---|---|
| JP | 2013033191 | 2/2013 |
| JP | 2016110642 | 6/2016 |
| JP | 2017196742 | 11/2017 |

OTHER PUBLICATIONS

"Office Action of Japan Counterpart Application" with English translation thereof, dated Apr. 12, 2022, p. 1-p. 11.

* cited by examiner

*Primary Examiner* — Moustapha Diaby
(74) *Attorney, Agent, or Firm* — JCIPRNET (57) ABSTRACT

An information processing apparatus includes a detection section that detects an operation to be performed with respect to a device by a user in a non-operation state with respect to the device, and a prohibition section that prohibits reboot of the device in a case where the operation to be performed on the device is detected by the detection section.

13 Claims, 11 Drawing Sheets

| Chain | Link | REWRITE VALUE |
|---|---|---|
| 700 | 123 | 2 |
| 700 | 020 | 15 |
| 820 | 027 | 5 |
| 820 | 115 | 8 |

| Chain | Link | REWRITE VALUE | SETTING DEVICE | SETTING STATE |
|---|---|---|---|---|
| 700 | 123 | 2 | OUTPUT DEVICE | UNSET |
| 700 | 020 | 15 | OUTPUT DEVICE | UNSET |

FIG. 11A

| Chain | Link | REWRITE VALUE | SETTING DEVICE | SETTING STATE |
|---|---|---|---|---|
| 700 | 123 | 2 | OUTPUT DEVICE | UNSET |
| 700 | 020 | 15 | OUTPUT DEVICE | UNSET |
| 820 | 027 | 5 | INPUT DEVICE | UNSET |
| 820 | 115 | 8 | INPUT DEVICE | UNSET |

FIG. 11B

| Chain | Link | REWRITE VALUE | SETTING DEVICE | SETTING STATE |
|---|---|---|---|---|
| 700 | 123 | 2 | OUTPUT DEVICE | COMPLETELY SET |
| 700 | 020 | 15 | OUTPUT DEVICE | COMPLETELY SET |
| 820 | 027 | 5 | INPUT DEVICE | UNSET |
| 820 | 115 | 8 | INPUT DEVICE | UNSET |

INFORMATION PROCESSING APPARATUS, IMAGE FORMING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-119117 filed Jun. 22, 2018.

BACKGROUND

(i) Technical Field

The present invention relates to an information processing apparatus, an image forming apparatus, and a non-transitory computer readable medium storing a program.

(ii) Related Art

JP2016-110642A discloses an information processing apparatus including setting means that receives setting of time, at which the information processing apparatus is periodically rebooted, from a user, storage means that stores the time received by the setting means and a prescribed condition used to determine whether or not to perform reboot at the time, determination means that determines to perform the reboot in a case where the information processing apparatus is rebooted at the time stored in the storage means and an operational situation of the information processing apparatus coincides with the prescribed condition stored in the storage means, and reboot execution means that performs the reboot according to the determination of the determination means.

SUMMARY

However, there is a case where setting of a device is changed through a remote operation. Here, in order to cause a change in the setting of the device to be available, it is demanded to reboot the device. Here, in a case where the reboot is performed, use of the device is limited even in a case where a user who tries to use the device exists.

Aspects of non-limiting embodiments of the present disclosure relate to an information processing apparatus, an image forming apparatus, and a non-transitory computer readable medium storing a program, which are capable of prohibiting the reboot of the device in a case where the user who tries to use the device exists.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a detection section that detects an operation to be performed with respect to a device by a user in a non-operation state with respect to the device; and a prohibition section that prohibits reboot of the device in a case where the operation to be performed on the device is detected by the detection section.

Meanwhile, here, the non-operation state indicates a state in which the user is not in contact with the information processing apparatus. In addition, the operation indicates movement of a body of the user in order to perform a work, and includes, for example, approach of a person to the information processing apparatus or an operation performed on the information processing apparatus via a network.

Here, a motion sensor is a sensor for detecting the presence of a person in which infrared rays, ultrasonic waves, visible light, and the like are used.

BRIEF DESCRIPTION OF THE DRAWINGS

Exemplary embodiment(s) of the present invention will be described in detail based on the following figures, wherein:

FIGS. 11A and 11B illustrate chain lists used for the fourth exemplary embodiment relevant to the control operation in the information processing apparatus according to the exemplary embodiment of the present invention, FIG. 11A illustrates a case where all setting devices are in unset states, and FIG. 11B illustrates a case where an output device is in a completely set state.

DETAILED DESCRIPTION

Subsequently, an exemplary embodiment of the present invention will be described in detail with reference to the accompanying drawings.

Figure 1:
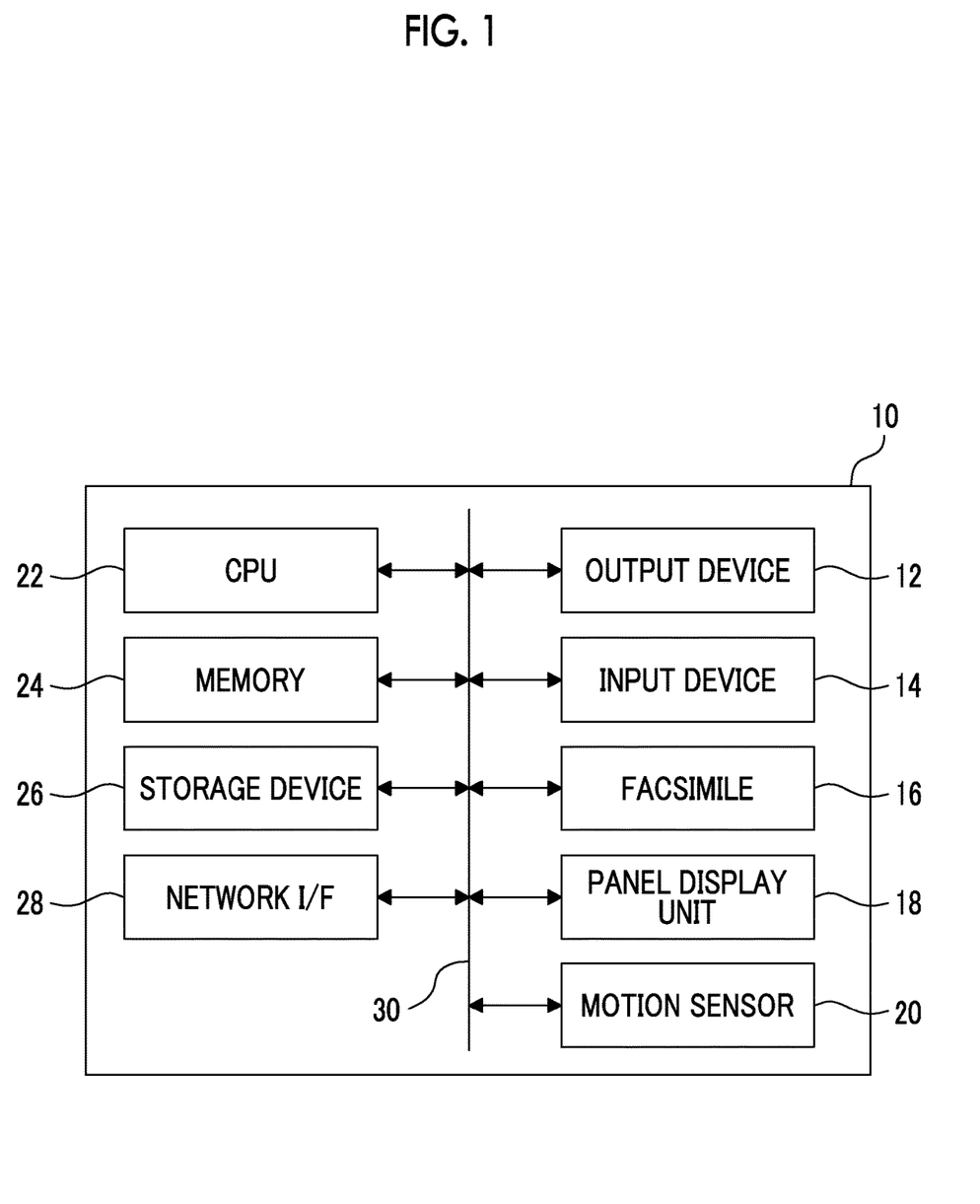
FIG. 1 is a block diagram illustrating an information processing apparatus according to an exemplary embodiment of the present invention.

FIG. 1 illustrates an information processing apparatus 10 according to the exemplary embodiment of the present invention.

The information processing apparatus 10 is, for example, an image forming apparatus. The information processing apparatus 10 includes a plurality of devices 12, 14, and 16. The device 12 is, for example, an output device which includes an image forming unit, the device 14 is, for example, an input device which includes an image reading device, and a device 16 is, for example, a facsimile device.

In addition, the information processing apparatus 10 includes a panel display unit 18. The panel display unit 18 is configured in such a way that, for example, a touch panel overlaps a liquid crystal display unit. An operation state is displayed by the panel display unit 18, and setting is performed on each of the devices 12 to 16.

In addition, the information processing apparatus 10 is provided with a motion sensor 20. The motion sensor 20 detects whether or not a person exists around the information processing apparatus 10.

In addition, the information processing apparatus 10 includes a CPU 22, a memory 24, a storage device 26, and a network interface 28. The CPU 22, the memory 24, the storage device 26, and the network interface 28 are connected to the devices 12 to 16, the panel display unit 18, and the motion sensor 20 through a control bus 30.

The CPU 22 performs a predetermined process based on a control program which is stored in the memory 24. Data is input to the network interface 28 via a network, and the network interface 28 outputs the data to the network. The storage device 26 includes, for example, a hard disk or the like, and stores the data.

Figure 2:
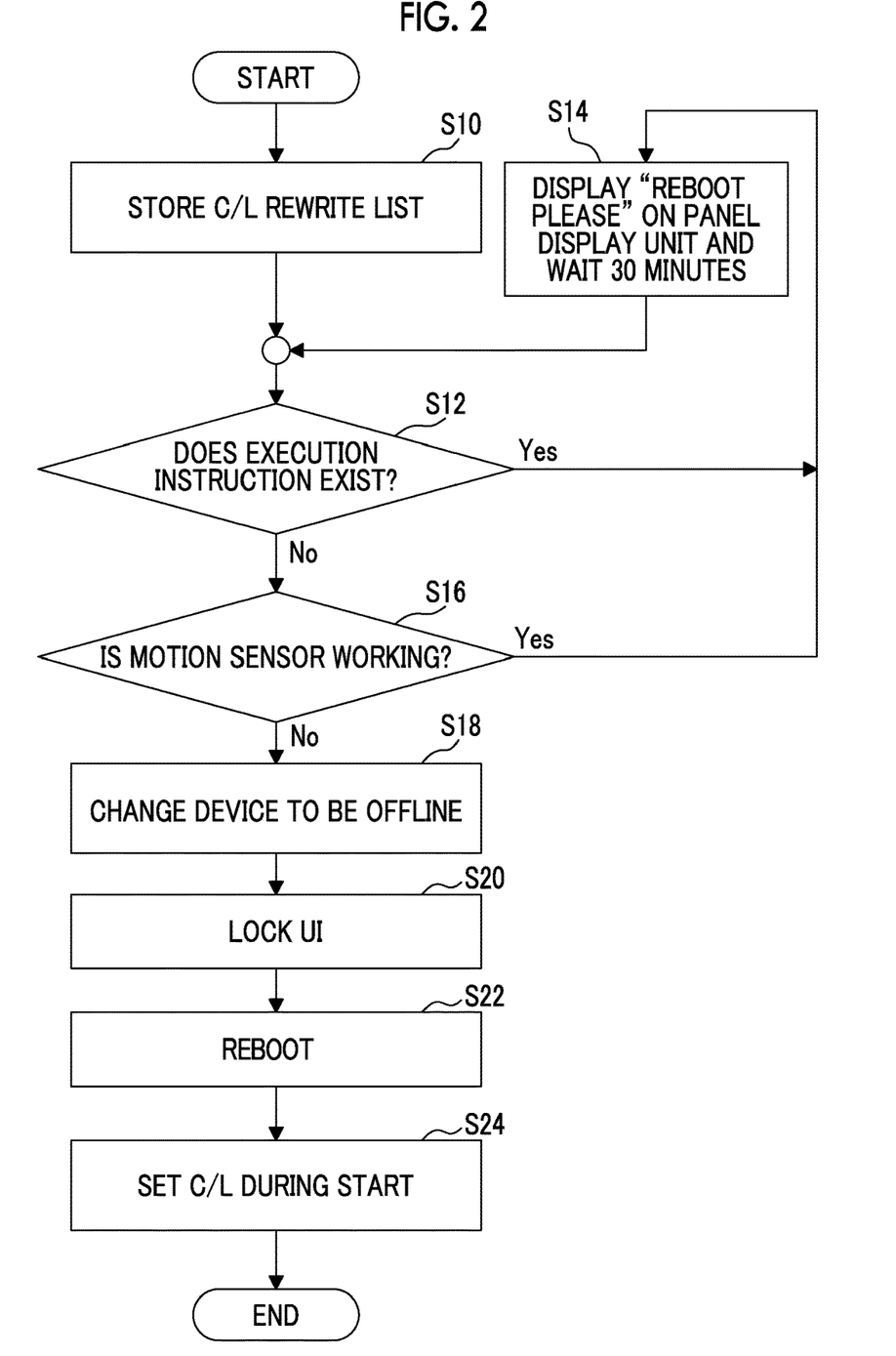
FIG. 2 is a flowchart illustrating a first exemplary embodiment relevant to a control operation in the information processing apparatus according to the exemplary embodiment of the present invention.

FIG. 2 is a flowchart illustrating a first exemplary embodiment relevant to a control operation in the information processing apparatus 10. The first exemplary embodiment illustrates a reboot control example in a non-operation state.

Figure 3:
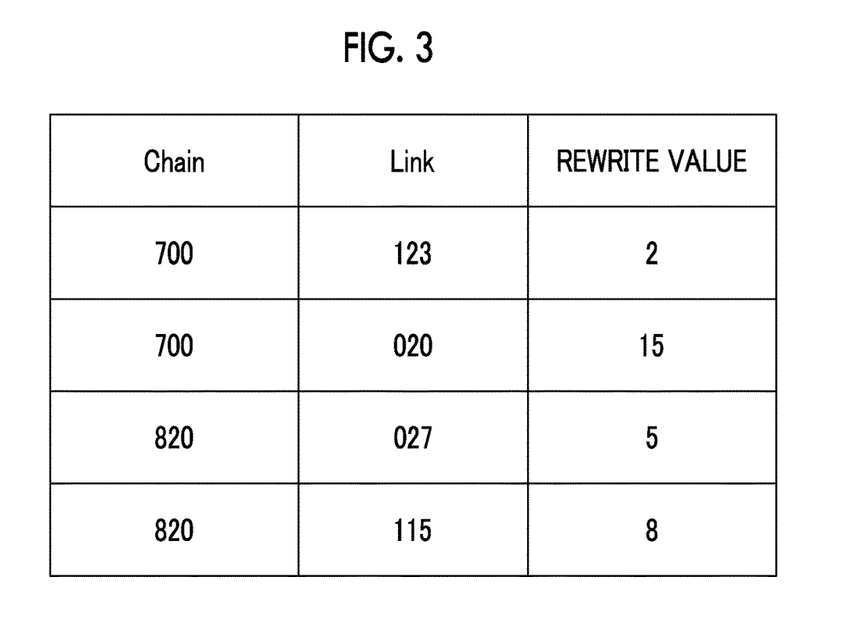
FIG. 3 is a table illustrating a chain list used for the first exemplary embodiment relevant to the control operation in the information processing apparatus according to the exemplary embodiment of the present invention.

First, in step S10, a chain link (C/L) rewrite list, which is received via the network interface 28, is stored in the storage device 26. The chain link is an ID used to specify a rewrite place, and includes a major classification "Chain" and a minor classification "Link", as illustrated in FIG. 3. The "Chain" corresponds to, for example, the devices 12 to 16. The C/L rewrite list is a list to which rewrite values used to be rewritten in the chain link are given.

In subsequent step S12, it is determined whether or not a signal used for a user to instruct to execute the devices 12 to 16 is detected via the network. For example, in a case where an instruction to execute printing is output from the personal computer which is connected to the network, it is determined whether or not a signal of the instruction is detected. In step S12, in a case where it is determined that the signal used to instruct execution is detected, the process proceeds to step S14, "reboot, please" is displayed on the above-described panel display unit 18, automatic reboot is prohibited, and, for example, a waiting state corresponding to 30 minutes is maintained.

Meanwhile, in a case where the reboot is performed according to the display of "reboot, please", processes in steps S18 to S26, which will be described later, are performed.

In contrast, in a case where it is determined that the signal used to instruct execution is not detected in step S12, the process proceeds to step S16. In step S16, it is determined whether or not existence of a person is detected from the above-described motion sensor 20. In a case where it is determined that the existence of the person is detected in step S16, the process proceeds to step S14. In contrast, in a case where it is determined that the existence of the person is not detected in step S16, the process proceeds to a subsequent step S18.

In subsequent step S18, the devices 12 to 16 are caused to be offline. The offline refers to a state which is not connected to the network.

In subsequent step S20, a user interface of the panel display unit 18 is locked, thereby being a state in which it is not possible to operate the devices 12 to 16. In step S22, the reboot is performed, and the process proceeds to subsequent step S24. In step S24, setting of the rewrite values is performed based on the C/L rewrite list during the reboot. In a case where the setting ends, the C/L rewrite list is removed, and the process ends.

In the first exemplary embodiment, the motion sensor 20 is one. However, a plurality of motion sensors may be provided.

Figure 4:
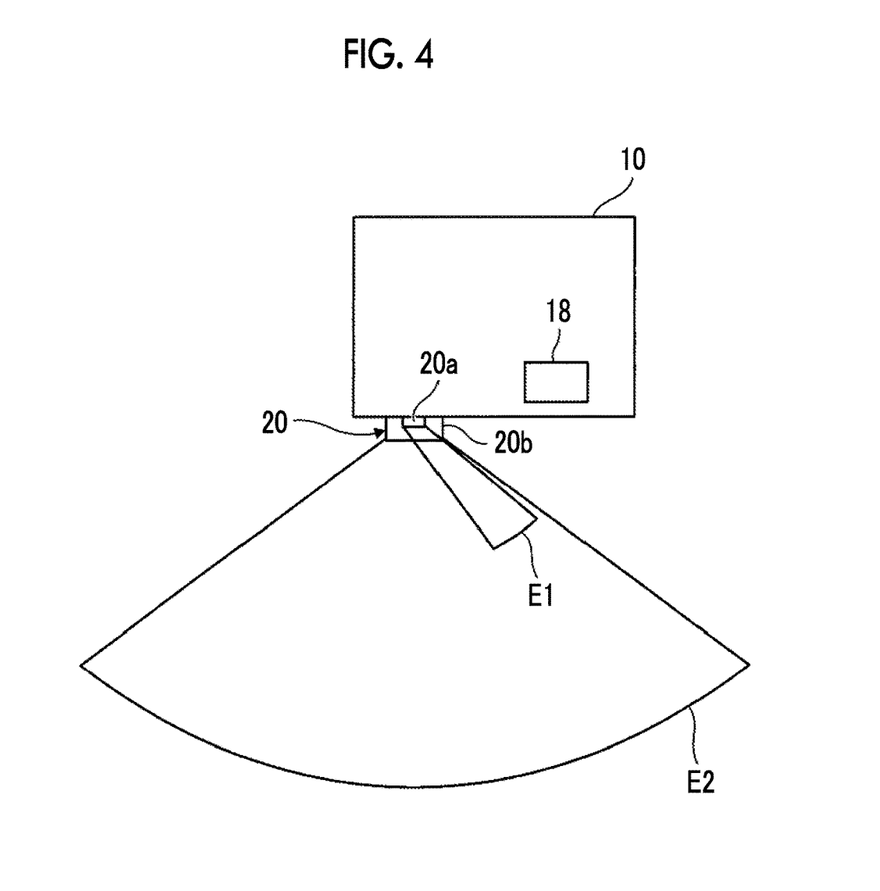
FIG. 4 is an explanatory diagram illustrating a modification example of the first exemplary embodiment relevant to the control operation in the information processing apparatus according to the exemplary embodiment of the present invention.
Figure 5:
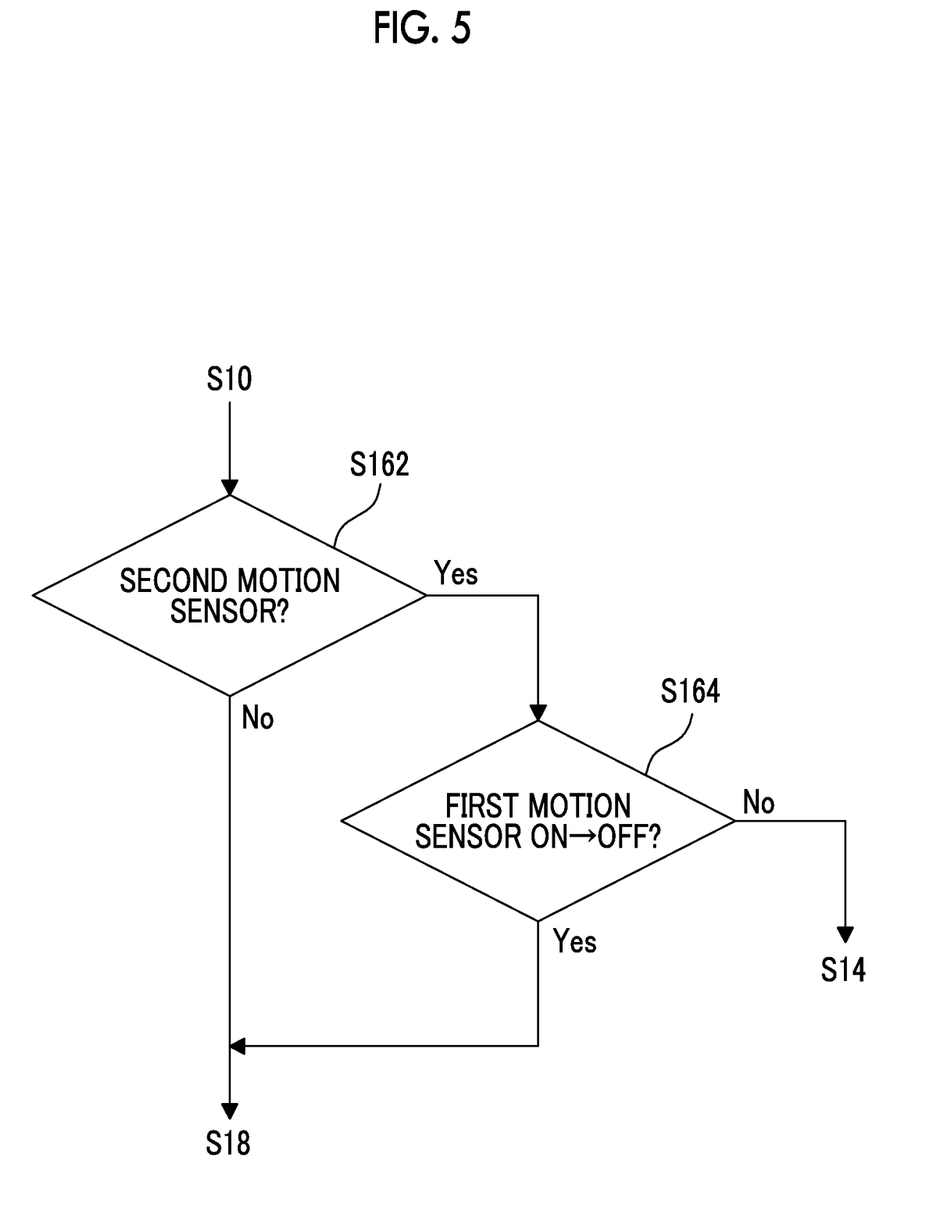
FIG. 5 is a flowchart illustrating the modification example of the first exemplary embodiment relevant to the control operation in the information processing apparatus according to the exemplary embodiment of the present invention.

FIGS. 4 and 5 illustrate a modification example of the first exemplary embodiment in which two motion sensors 20a and 20b are provided in the information processing apparatus 10.

The first motion sensor 20a is, for example, a reflection sensor, and the second motion sensor 20b is, for example, a pyroelectric sensor. Although the first motion sensor 20a has larger power consumption than the second motion sensor 20b, the first motion sensor 20a accurately detects existence of a person. As illustrated as an area E1 in FIG. 4, the first motion sensor 20a is set to have narrow right and left widths in front of the information processing apparatus 10 such that detection is possible in a case where a person operates the panel display unit 18. In contrast, as illustrated as an area E2 in FIG. 4, the second motion sensor 20b has wide widths in right and left directions so as to be a fan shape in front of the information processing apparatus 10 such that it is possible to detect a person up to approximately 800 mm to 1000 mm from a front end part of the information processing apparatus 10.

Subsequently, the control operation will be described. As illustrated in FIG. 5, it is determined whether or not a person is detected by the second motion sensor 20b in step S162. In a case where it is determined that a person is not detected by the second motion sensor 20b in step S162, the process proceeds to step S18, and a process of permitting the reboot is performed. In contrast, in a case where a person is detected in step S162, the process proceeds to step S164. In step S164, it is determined whether or not the first motion sensor 20a is changed from a working state to a non-working state. In a case where it is determined that first motion sensor 20a is not changed from the working state to the non-working state step S164, the process proceeds to step S14, and a process of prohibiting the reboot is performed.

In a case where the user approaches the information processing apparatus 10 in order to use the information processing apparatus 10, the user is detected by the second motion sensor 20b first. In step S162, the reboot is prohibited in a stage in which the user comes to a far place in a case of being viewed from the information processing apparatus 10 rather than detection performed by the first motion sensor 20a, thereby ensuring safety with respect to elimination of data or the like. In contrast, in a case where the user is separated from the information processing apparatus 10, the prohibition of the reboot is released in a stage in which an output of the first motion sensor 20a changes from ON to OFF, and thus the reboot is possible in an earlier stage, in which the use of the information processing apparatus 10 of the user ends, rather than a case of waiting for until it is not possible for the second motion sensor 20*b* to detect the person.

In the first exemplary embodiment, an example of reboot control in the non-operation state. However, in an exemplary embodiment which will be described below, an example of the reboot control, which also includes the operation state, will be described.

In the exemplary embodiment below, a condition A, which is used to permit the reboot of the information processing apparatus 10, is as follows.

a. There is no job.
b. Data is not being received.
c. The facsimile line is not being used.
d. The panel is not being operated.
e. The motion sensor is not working.

Here, the "job" is a unit in which input/output of an image is performed according to a process request from the user. The job includes a print job, a copy job, a scan job, a facsimile transmission job, and a facsimile reception job.

FIGS. 6A to 6E are chart diagrams used to describe respective jobs.

Figure 6A:
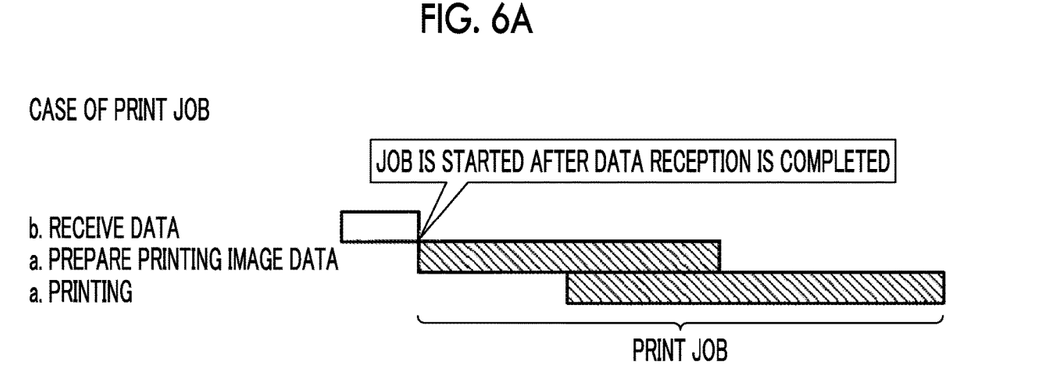
FIGS. 6A to 6E are explanatory diagrams illustrating contents of jobs which are performed by the information processing apparatus according to the exemplary embodiment of the present invention.

As illustrated in FIG. 6A, in a case of the print job, first, data reception is performed in b. In a case where the reception is completed, preparing of printing image data starts. In a case where the image data corresponding to a predetermined amount of data is prepared, printing starts. The printing is executed until the printing ends. Here, the "print job" is a process performed from the start of the preparing of the printing image data to the end of execution of the printing.

Figure 6B:
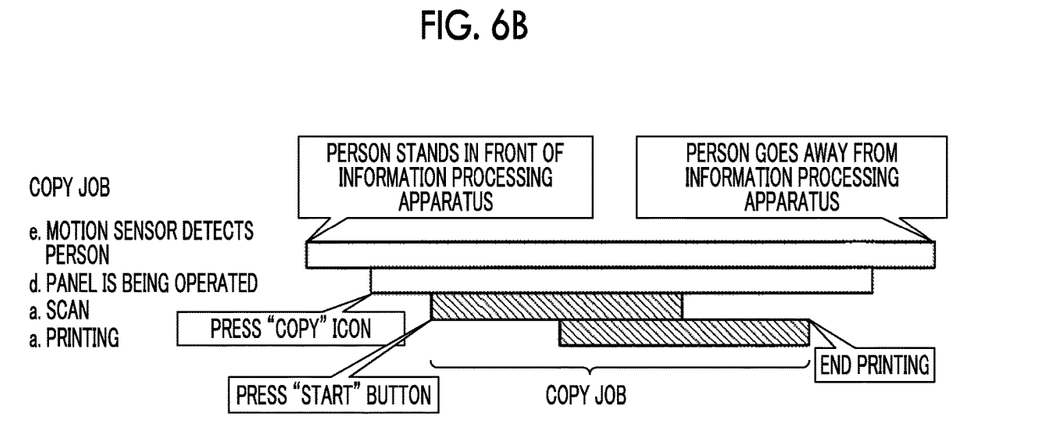

As illustrated in FIG. 6B, in a case of the copy job, the motion sensor detects that a person stands in front of the information processing apparatus in e. In a case where a copy selection icon (copy selection button) of the panel display unit is pressed, the copy is selected, and a panel operation starts in d. In a case where a start button of the panel display unit is subsequently pressed, scanning (reading) of a document starts. In a case where the image data corresponding to a predetermined amount of data is scanned, the printing starts, and the printing is executed until the printing ends. Thereafter, the panel operation ends, and, further, the motion sensor detects that the person goes away from the information processing apparatus. Here, the "copy job" is a process performed from the start of the scanning of the document to the end of execution of the printing.

Figure 6C:
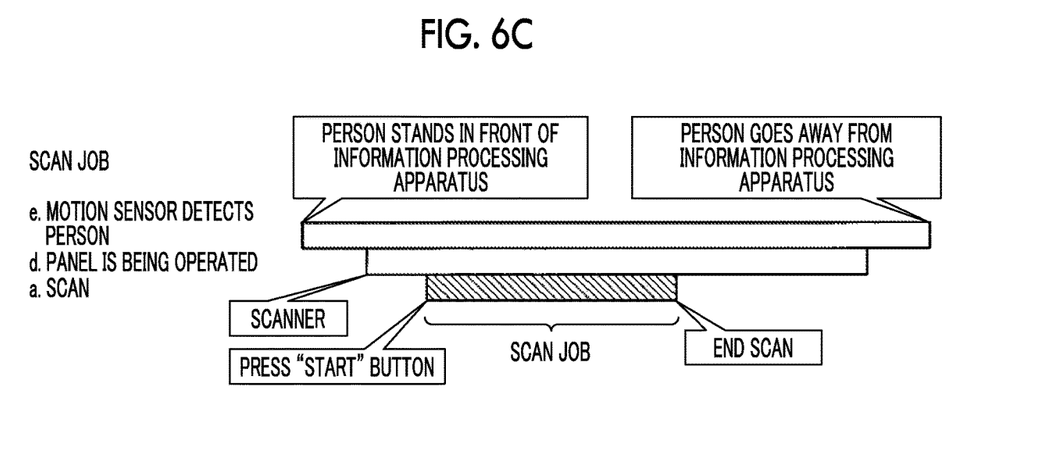

As illustrated in FIG. 6C, in a case of the scan job, the motion sensor detects that the person stands in front of the information processing apparatus in e. In a case where a scanner selection icon (scanner selection button) of the panel display unit is pressed, a scanner is selected, and the panel operation in d starts. In a case where the start button of the panel display unit is subsequently pressed, the scanning (reading) of the document starts. The scanning is performed until the scanning ends. Thereafter, the panel operation ends, and, further, the motion sensor detects that the person goes away from the information processing apparatus. Here, the "scan job" is a process performed from the start of the scanning of the document to the end of the scanning of the document.

Figure 6D:
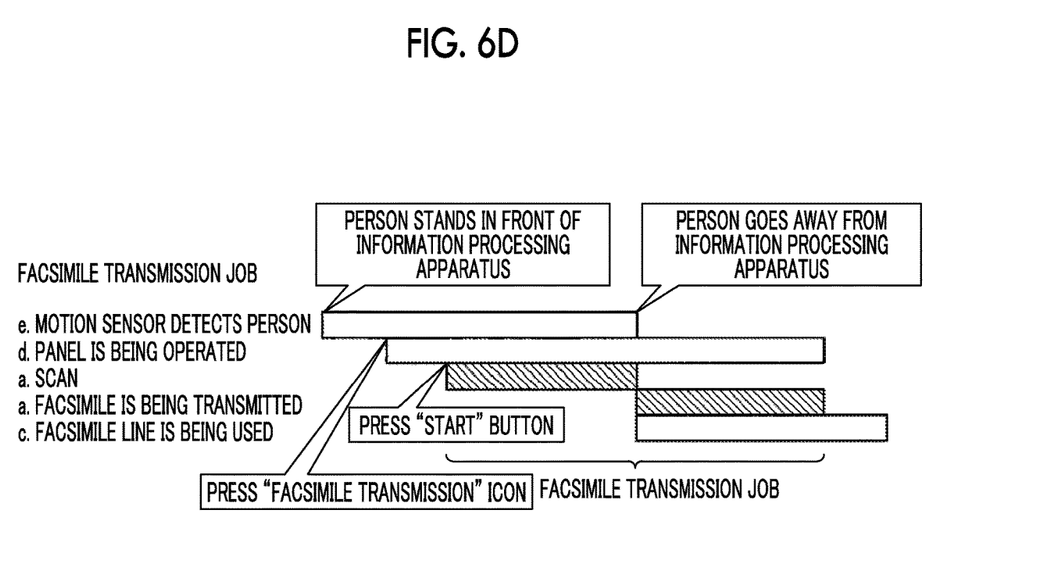

As illustrated in. 6D, in a case of the facsimile transmission job, the motion sensor detects that the person stands in front of the information processing apparatus in e. In a case where a facsimile transmission icon (facsimile transmission selection button) of the panel display unit is pressed, the facsimile transmission is selected and the panel operation in d starts. In a case where the start button of the panel display unit is subsequently pressed, the scanning (reading) of the document starts. In a case where the scanning of the image data corresponding to a predetermined amount of data is performed, the facsimile transmission starts, thereby being a state in which a facsimile line is being used in c. Even after the motion sensor detects that the person goes away from the information processing apparatus, the panel operation, a state in which the facsimile is being transmitted, and a state in which the facsimile line is being used are continued, and thus the information processing apparatus is executed until the states end. Here, the "facsimile transmission job" is a process performed from the start of the scanning to the end of the facsimile transmission.

Figure 6E:
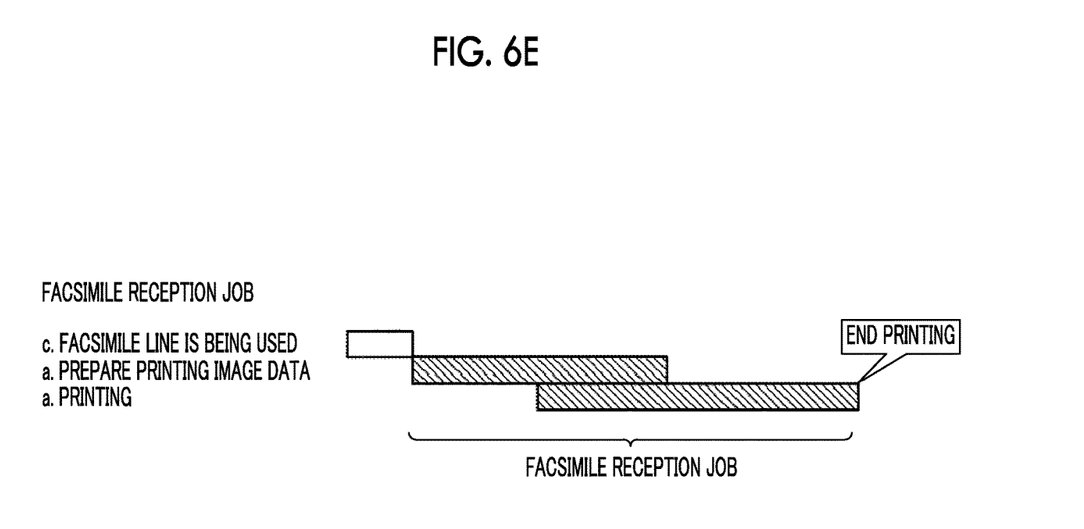

As illustrated in FIG. 6E, in a case of a facsimile reception job, in a case where facsimile reception starts, the facsimile line is being used in c. In a case where the facsimile reception ends, the preparing of the printing image data starts. In a case where the image data corresponding to a predetermined amount of data is prepared, the printing starts, and the printing is executed until the printing ends. Here, the "facsimile reception job" is a process performed from the start of the preparing the printing image data to end of the execution of the printing.

Figure 7:
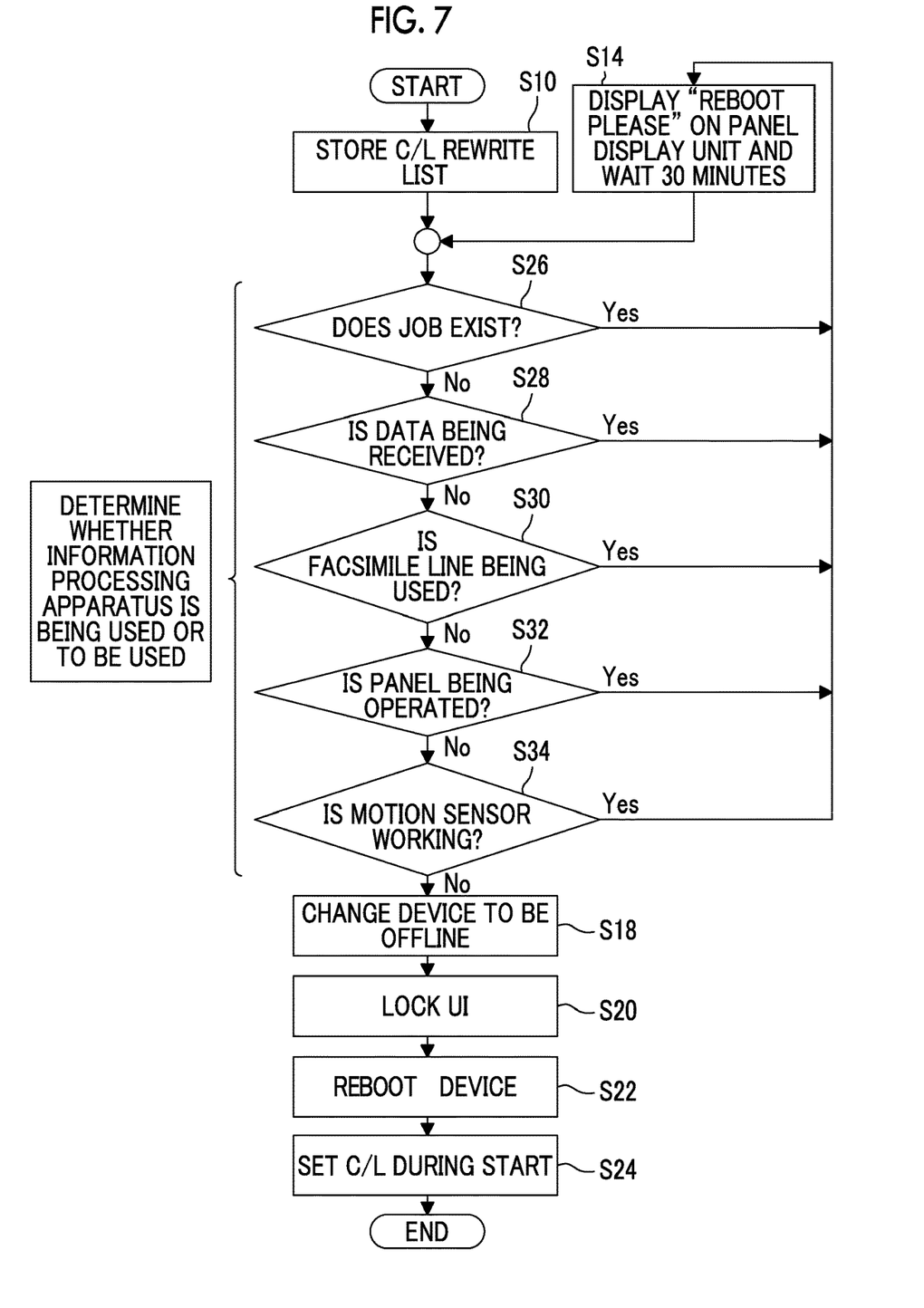
FIG. 7 is a flowchart illustrating a second exemplary embodiment relevant to the control operation in the information processing apparatus according to the exemplary embodiment of the present invention.

FIG. 7 is a flowchart illustrating a second exemplary embodiment relevant to the control operation of the information processing apparatus 10.

Similar to the above-described first exemplary embodiment, first, the C/L rewrite list is stored in step S10.

In subsequent step S26, it is determined whether or not a job exists. The job includes the print job, the copy job, the scan job, the facsimile transmission job, and the facsimile reception job illustrated in FIGS. 6A to 6E.

In step S26, in a case where it is determined that the job exists, the process proceeds to step S14, "reboot, please" is displayed on the panel display unit, and a waiting state corresponding to 30 minutes is maintained. In contrast, in a case where it is determined that the job does not exist in step S26, the process proceeds to step S28.

In step S28, it is determined whether or not the data reception is being performed. In a case where it is determined that the data reception is being performed in step S28, the process proceeds to step S14. In contrast, in a case where it is determined that the data reception is not being performed in step S28, the process proceeds to step S30.

In step S30, it is determined whether or not the facsimile line is being used. In a case where it is determined that the facsimile line is being used in step S30, the process proceeds to step S14. In contrast, in a case where it is determined that the facsimile line is not being used in step S30, the process proceeds to subsequent step S32.

In step S32, it is determined whether or not the panel operation is being performed. In a case where it is determined that the panel operation is being performed in step S32, the process proceeds to step S14. In contrast, in a case where it is determined that the panel operation is not being performed in step S32, the process proceeds to subsequent step S16.

In step S34, it is determined whether or not the motion sensor is working. In a case where it is determined that the motion sensor is working in step S34, the process proceeds to step S14. In contrast, in a case where it is determined that the motion sensor is not working in step S34, the reboot process in steps S18 to S24 is performed and the process ends, similar to the above-described first exemplary embodiment.

In steps S26 to S34, it is determined whether the information processing apparatus 10 is being used or to be used.

In a case where the information processing apparatus 10 is being used or to be used, the reboot is prohibited. Otherwise, that is, in a case of coinciding with the above-described condition A, the reboot is performed.

Meanwhile, the process in step S34 may be determined using a plurality of motion sensors as described in the above-described modification example of the first exemplary embodiment.

Figure 8:
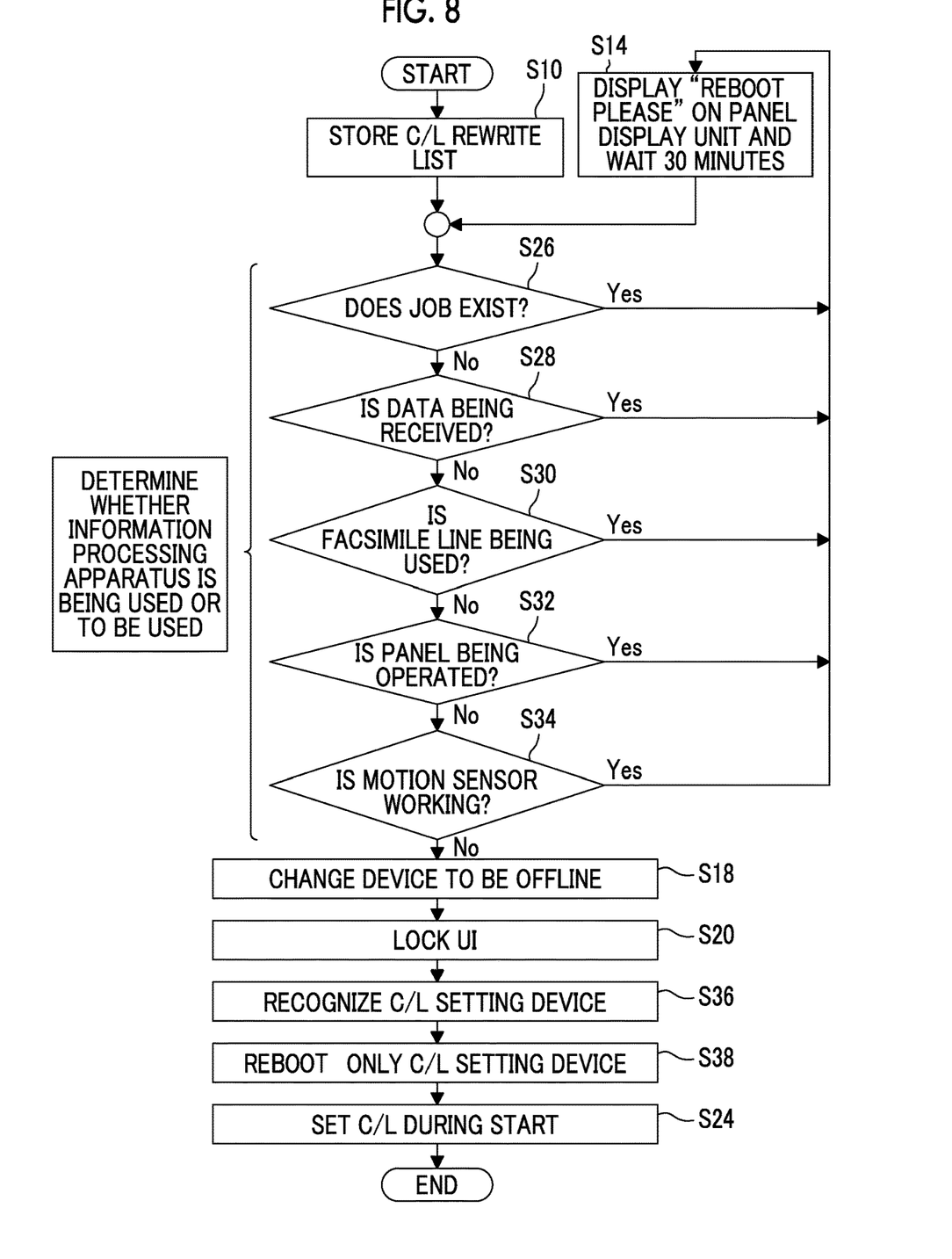
FIG. 8 is a flowchart illustrating a third exemplary embodiment relevant to the control operation in the information processing apparatus according to the exemplary embodiment of the present invention.

FIG. 8 is a flowchart illustrating a third exemplary embodiment relevant to the control operation of the information processing apparatus 10. The third exemplary embodiment causes only a device, which demands rewrite, to reboot, compared to the above-described second exemplary embodiment.

Figure 9:
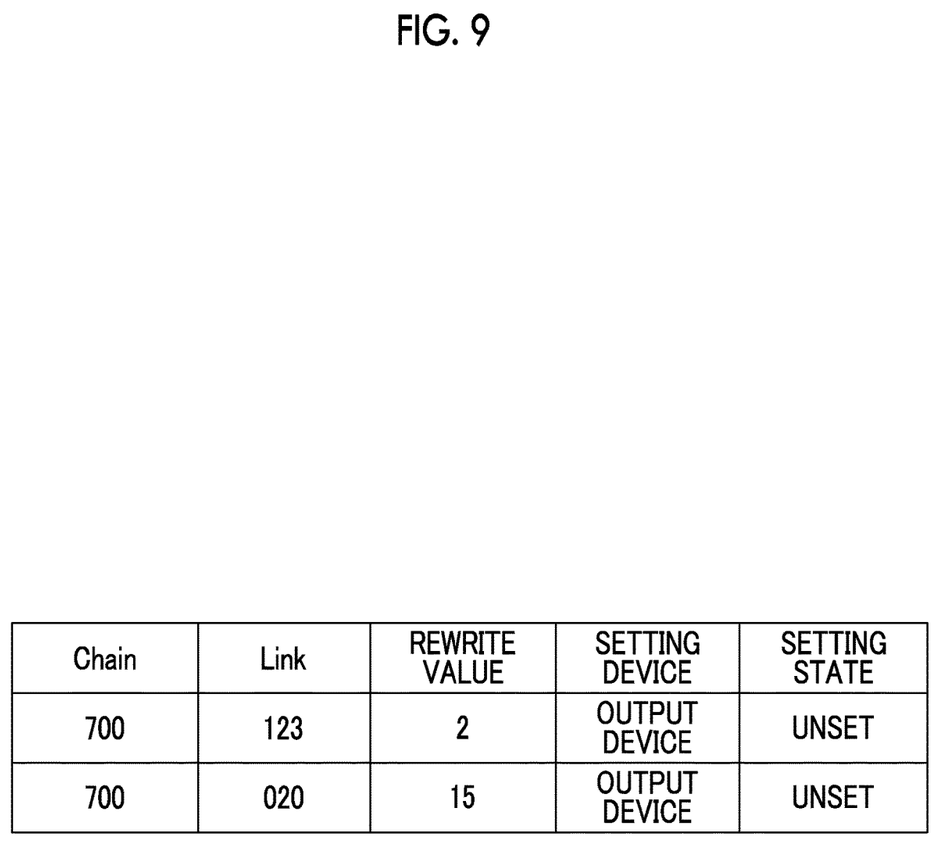
FIG. 9 is a table illustrating a chain list used for the third exemplary embodiment relevant to the control operation in the information processing apparatus according to the exemplary embodiment of the present invention.

That is, in the third exemplary embodiment, the C/L rewrite list includes the C/L corresponding to a setting device and, further, is associated with a setting state with respect to the setting device, as illustrated in FIG. 9. Here, only an output device, which is the setting device 12, is included in the C/L list.

After the user interface of the panel display unit 18 is locked in step S20, a C/L setting device is recognized in step S36. Here, it is recognized that the C/L setting device is the output device. In subsequent step S38, only the C/L setting device is rebooted. In subsequent step S24, setting of the C/L rewrite values is performed during start. In a case where the setting ends, the C/L rewrite list is removed, and the process ends.

Meanwhile, in the third exemplary embodiment, the same step numbers are attached to the same parts as in the second exemplary embodiment, and description thereof will not be repeated.

Figure 10:
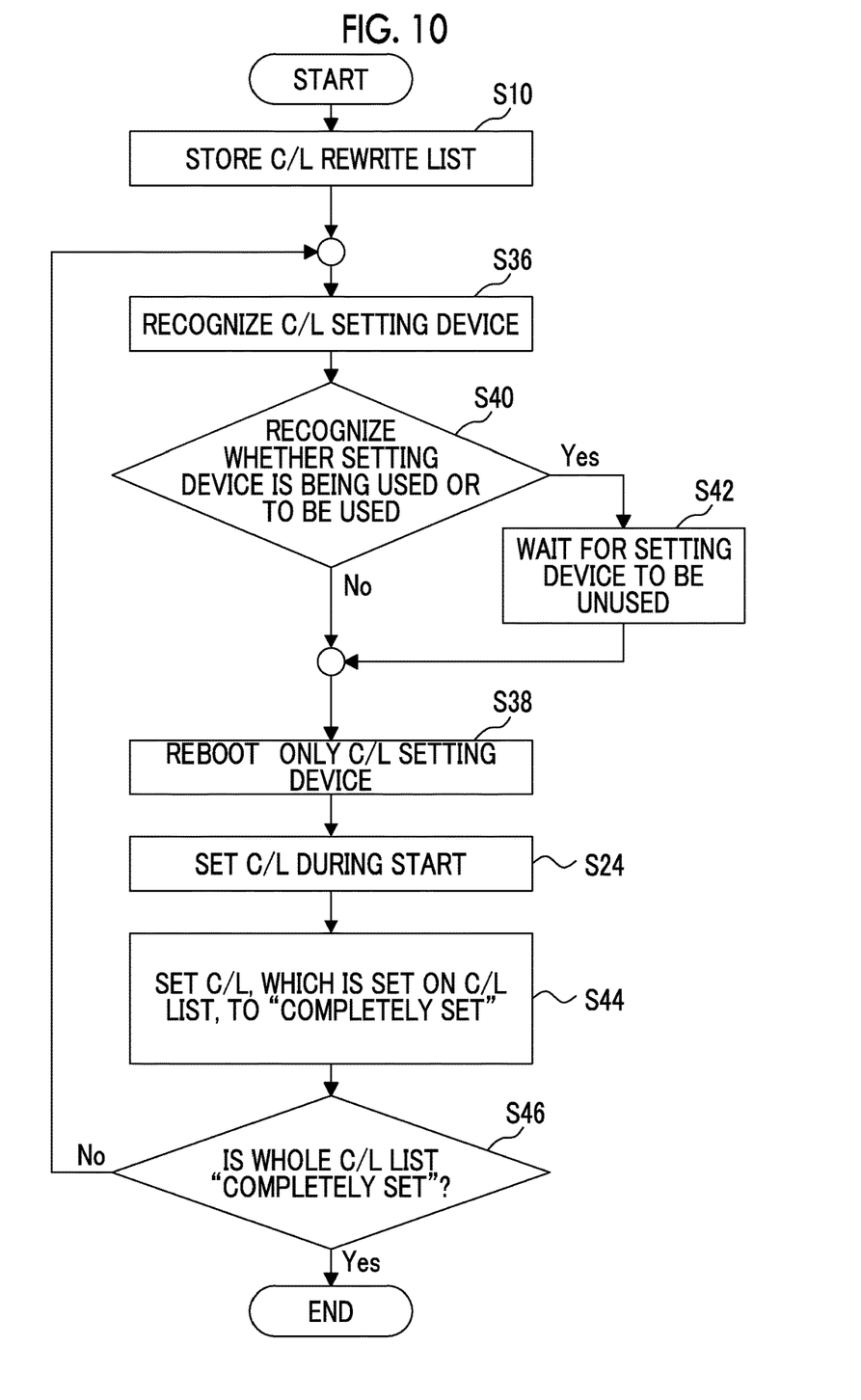
FIG. 10 is a flowchart illustrating a fourth exemplary embodiment relevant to the control operation in the information processing apparatus according to the exemplary embodiment of the present invention.

FIG. 10 is a flowchart illustrating a fourth exemplary embodiment relevant to the control operation of the information processing apparatus 10. In the fourth exemplary embodiment, a condition of a device, which demands rewrite, is partially determined, and the device is partially rebooted, compared to the above-described second exemplary embodiment.

Figure 11A:
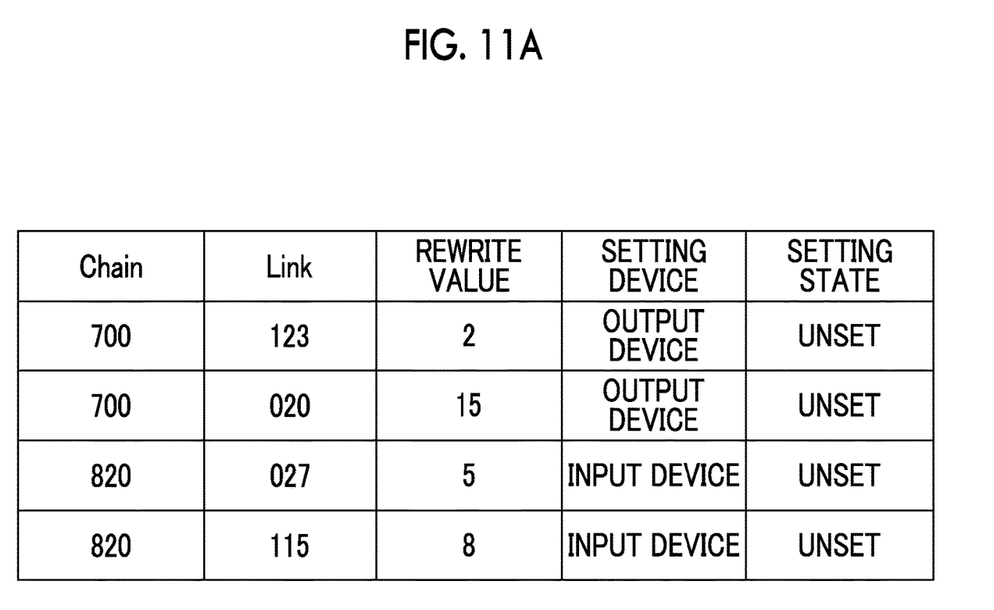

That is, in the fourth exemplary embodiment, the C/L rewrite list includes the C/L corresponding to the setting device, and, further, is associated with a setting state for the setting device, as illustrated in FIG. 11A. Here, the output device, which is the setting device 12, and the input device, which is the setting device 14, are included in the C/L list.

After the C/L rewrite list is stored in step S10, the C/L setting device is recognized in subsequent step S36. Here, it is recognized that the C/L relevant to the output device exists.

In subsequent step S40, it is determined whether the setting device is being used or to be used. In a case where it is determined that the setting device is being used or to be used in step S40, the process proceeds to step S42, and a state of waiting until the setting device is unused is maintained. In contrast, in a case where it is determined that the setting device is not being used and is not to be used in step S40, the process proceeds to step S38, and only the setting device is rebooted. Here, in a case where the setting device is the output device, "facsimile line is not being used." in c shown in the above-described condition A is not considered as a reboot condition. Even in a case where the facsimile line is used, the reboot is performed in a case where another condition is satisfied.

In a case where the setting device is rebooted in step S38, the process proceeds to subsequent step S24, setting of the C/L rewrite values is performed during start in step S24, and the process proceeds to subsequent step S44.

Figure 11B:
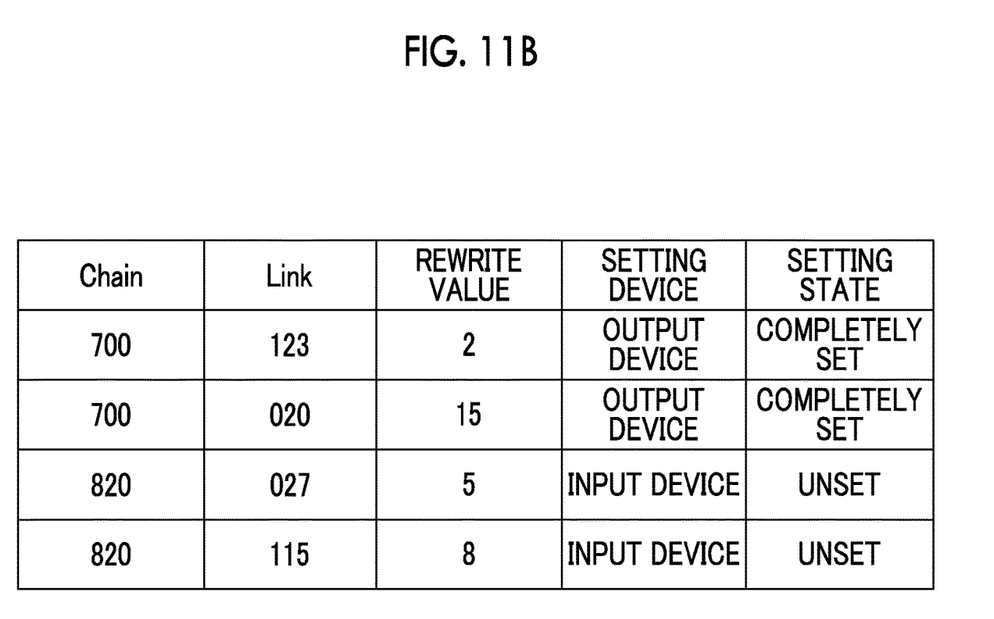

In step S44, the C/L, which is set in step S24, is completely set, as illustrated in FIG. 9B. In subsequent step S46, it is determined whether or not the whole C/L list is completely set. As illustrated in FIG. 9B, the output device is completely set and the input device is unset. Therefore, the process returns to step S36, and the process ends in a case where the input device is also completely set.

As described above, in a case where the device is being used or to be used, reboot of the device is prohibited. In a case where release is performed thereafter, prohibition of the reboot of the device is released. There is a case where an additional C/L list is received during a period from the prohibition of the reboot to the releases.

Subsequent patterns A and B are provided to correspond to the case.

Pattern A:
1) The additional C/L list is stored in the storage device 26.
2) First, the additional C/L list is merged with the C/L list stored in the storage device 26, and one C/L list is prepared.
3) Hereinafter, reboot is performed similar to the first to fourth exemplary embodiments.

Pattern B:
1) The additional C/L list and the former C/L list are separately stored in the storage device 26 such that it is possible to separately manage the former C/L list and the additional C/L list.
2) In the case of reboot, after reflection of the whole former C/L list is finished, a device setting process proceeds according to an added newest C/L list.

Meanwhile, although the example of the image forming apparatus is described in the exemplary embodiment, the present invention is not limited thereto. For example, another information processing apparatus, such as a personal computer or a server, may be included.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
  a detection section that detects an operation to be performed with respect to a device by a user in a non-operation state with respect to the device; and
  a prohibition section that prohibits reboot of the device in a case where the operation to be performed on the device is detected by the detection section,
  wherein the detection section includes a plurality of motion sensors,
  wherein the plurality of motion sensors include a first motion sensor and a second motion sensor which detects a person at a longer distance than a person detected by the first motion sensor, and
  wherein the prohibition section prohibits the reboot of the device in a case where a person is detected by the second motion sensor.

2. The information processing apparatus according to claim 1, wherein the detection section detects an execution instruction performed by the user via a network.

3. The information processing apparatus according to claim 2, further comprising:
a release section that releases prohibition performed by the prohibition section in a case where the detection section detects that the device is not to be used based on a state in which the reboot of the device is prohibited by the prohibition section.

4. The information processing apparatus according to claim 3,
wherein a plurality of the devices are provided, and
wherein the release section collectively releases the prohibition of the reboot of a device which is a reboot target.

5. The information processing apparatus according to claim 1, further comprising:
a release section that releases prohibition performed by the prohibition section in a case where the detection section detects that the device is not to be used based on a state in which the reboot of the device is prohibited by the prohibition section.

6. The information processing apparatus according to claim 5,
wherein a plurality of the devices are provided, and
wherein the release section collectively releases the prohibition of the reboot of a device which is a reboot target.

7. The information processing apparatus according to claim 5,
wherein, in a case where the reboot is set a plurality of times, the release section collectively releases the prohibition of the reboot.

8. The information processing apparatus according to claim 5,
wherein, in a case where the reboot is set a plurality of times, the release section releases newest reboot setting prohibition after releasing former reboot setting prohibition.

9. The information processing apparatus according to claim 1,
wherein a release section releases prohibition performed by the prohibition section in a case where the first motion sensor does not detect the person after the first motion sensor detects the person.

10. The information processing apparatus according to claim 1,
wherein a plurality of the devices are provided, and
wherein the prohibition section prohibits the reboot with respect to only a device which is a reboot target.

11. The information processing apparatus according to claim 10,
wherein, in a case where an operation to be performed on the device which is the reboot target ends, prohibition of the prohibition section is released.

12. An image forming apparatus comprising:
a detection section that detects an operation to be performed with respect to a device by a user in a non-operation state with respect to the device; and
a prohibition section that prohibits reboot of the device in a case where the operation to be performed on the device is detected by the detection section,
wherein the detection section includes a plurality of motion sensors,
wherein the plurality of motion sensors include a first motion sensor and a second motion sensor which detects a person at a longer distance than a person detected by the first motion sensor, and
wherein the prohibition section prohibits the reboot of the device in a case where a person is detected by the second motion sensor.

13. A non-transitory computer readable medium storing a program causing a computer to perform a process, the process comprising:
detecting an operation to be performed with respect to a device by a user in a non-operation state with respect to the device; and
prohibiting reboot of the device in a case where the operation to be performed on the device is detected,
wherein the detecting is performed by a plurality of motion sensors,
wherein the plurality of motion sensors include a first motion sensor and a second motion sensor which detects a person at a longer distance than a person detected by the first motion sensor, and
wherein the reboot of the device is prohibited in a case where a person is detected by the second motion sensor.

* * * * *